(12) United States Patent
Wang et al.

(10) Patent No.: US 11,098,839 B2
(45) Date of Patent: Aug. 24, 2021

(54) TURNING INTERLOCKING COUPLING STRUCTURE

(71) Applicant: FIVETECH TECHNOLOGY INC., New Taipei (TW)

(72) Inventors: Ting-Jui Wang, New Taipei (TW); Tzu-Hsuan Chang, New Taipei (TW)

(73) Assignee: FIVETECH TECHNOLOGY INC., New Taipei (TW)

( * ) Notice: Subject to any disclaimer, the term of this patent is extended or adjusted under 35 U.S.C. 154(b) by 0 days.

(21) Appl. No.: 16/848,865

(22) Filed: Apr. 15, 2020

(65) Prior Publication Data
US 2020/0332942 A1 Oct. 22, 2020

(30) Foreign Application Priority Data
Apr. 17, 2019 (TW) .................................. 108204719

(51) Int. Cl.
*F16M 11/04* (2006.01)
*F16B 5/06* (2006.01)
*F16B 37/04* (2006.01)

(52) U.S. Cl.
CPC .......... *F16M 11/045* (2013.01); *F16B 5/0642* (2013.01); *F16B 37/042* (2013.01); *F16B 37/048* (2013.01)

(58) Field of Classification Search
CPC .... F16B 5/00; F16B 5/02; F16B 21/00; F16B 21/02; F16B 21/07; F16B 21/073; F16B 39/22; F16B 5/0208; F16B 5/0266; F16M 11/045
See application file for complete search history.

(56) References Cited

U.S. PATENT DOCUMENTS

| | | | | |
|---|---|---|---|---|
| 5,256,015 A * | 10/1993 | St. Clair | ............... | F16B 31/021 411/396 |
| 6,722,052 B2 * | 4/2004 | Wu | ........ | F16B 5/0208 33/613 |
| 8,939,691 B2 * | 1/2015 | Tseng | ....................... | F16B 21/04 411/347 |
| 9,746,015 B2 * | 8/2017 | Tseng | ....................... | F16B 21/02 |
| 10,132,345 B2 * | 11/2018 | Wu | ......... | F16B 21/02 |
| 10,487,866 B2 * | 11/2019 | Wu | ......... | F16B 19/109 |
| 2012/0224935 A1 * | 9/2012 | Chiu | ..................... | F16B 5/0266 411/352 |
| 2012/0251265 A1 * | 10/2012 | Chiu | ..................... | F16B 5/0208 411/349 |
| 2012/0263555 A1 * | 10/2012 | Wang | ................... | F16B 5/0266 411/337 |
| 2013/0170895 A1 * | 7/2013 | Tseng | ....................... | F16B 35/06 403/270 |
| 2013/0183086 A1 * | 7/2013 | Wang | ................... | F16B 5/0642 403/327 |
| 2018/0073534 A1 * | 3/2018 | Wu | ....................... | F16B 5/0642 |
| 2018/0202481 A1 * | 7/2018 | Wu | ....................... | F16B 19/109 |

* cited by examiner

*Primary Examiner* — Christopher Garft

(57) ABSTRACT

A fastener structure includes a body portion, a control portion and a fastening portion. The control portion is movably fitted to the body portion. The control portion has a head portion and a limiting portion. The fastening portion is movably disposed at the body portion. The limiting portion is adapted to limit the fastening portion. Therefore, the body portion is disposed at the second object, and the control portion causes the fastening portion to be coupled to or separated from the first object, so as to couple together and separate at least two objects repeatedly and rapidly.

15 Claims, 14 Drawing Sheets

12

(a)　　　　(b)　　　　(c)　　　　(d)

TURNING INTERLOCKING COUPLING STRUCTURE

CROSS-REFERENCE TO RELATED APPLICATION

This non-provisional application claims priority under 35 U.S.C. § 119(a) on Patent Application No(s). 108204719 filed in Taiwan, R. O. C. on Apr. 17, 2019, the entire contents of which are hereby incorporated by reference.

BACKGROUND OF THE INVENTION

1. Field of the Invention

The present invention relates to a turning interlocking coupling structure and, more particularly, to a turning interlocking coupling structure capable of completing coupling or separation of at least two objects and thus achieving repeated quick coupling and separation.

2. Description of the Related Art

To couple at least one object, lock connection is usually performed using a screw so as to couple the object.

However, although being capable of coupling at least one object in a manner that is not easily separated, the conventional fixing means above can result in a complicated disassembly process or an insecure assembly after assembly.

Therefore, the present invention aims to disclose a turning interlocking coupling structure capable of being stably coupled to a first object or being fasteningly connected to or being unfastened from a second object, so as to complete coupling or separation of at least two objects and achieve the effect of repeated quick coupling and separation.

BRIEF SUMMARY OF THE INVENTION

In view of the issues and drawbacks of the prior art, the inventor has dedicated to research and development of a turning interlocking coupling structure which is capable of being stably coupled to a first object or being fasteningly connected to or being unfastened from a second object, so as to complete coupling or separation of at least two objects and achieve the object of repeated quick coupling and separation.

To achieve the above and other objects, the present invention provides a turning interlocking coupling structure including a head, a fastening portion and a body. The head includes a limiting portion on an inner edge thereof. The fastening portion is coupled to the head. The body is movably coupled with the head, and renders the fastening portion to be extended to the body. The body includes a first stopping portion and a second stopping portion on an outer edge thereof, and is configured to be assembled to a first object. When the head is driven, the head is limited at first stopping portion or the second stopping portion by the limiting portion, so as to enable the fastening portion to be unfastened from or be fasteningly connected to a second object.

The present invention further provides a turning interlocking coupling structure including a head, a fastening portion and a body. The fastening portion is coupled to the head. The body is movably coupled with the head, and renders the fastening portion to be extended to the body. The body is configured to be assembled to a first object. When the head is driven, the fastening portion is enabled to be unfastened from or be fasteningly connected to a second object.

In the foregoing turning interlocking coupling structure, one end of the fastening portion is coupled to the head by a bolt connector.

In the foregoing turning interlocking coupling structure, an elastic element is further included. One end of the elastic element is abutted against the head, and the other end is abutted against the body.

In the foregoing turning interlocking coupling structure, a sleeve connection portion is provided on one end of the fastening portion. The sleeve connection portion couples the fastening portion and the head by a bolt connector.

In the foregoing turning interlocking coupling structure, an elastic element is further included. One end of the elastic element is abutted against the sleeve connection portion, and the other end of the elastic element is abutted against the body.

In the foregoing turning interlocking coupling structure, a fastener is provided on one end of the fastening portion, and is configured to be fasteningly connected to the second object.

In the foregoing turning interlocking coupling structure, the body includes an assembly portion configured to be assembled to the first object.

In the foregoing turning interlocking coupling structure, the assembly portion includes a feed trough. The turning interlocking coupling structure is configured to be pressed by an external force such that the material of the first object is pressed into or flows into the feed trough, so as to enable the assembly portion to be assembled with the first object.

In the foregoing turning interlocking coupling structure, the body includes a shoulder configured to be leaned against the first object.

In the foregoing turning interlocking coupling structure, a guiding portion is provided near the first stopping portion, or a guiding portion is provided between the first stopping portion and the second stopping portion.

In the foregoing turning interlocking coupling structure, the head has a yielding space for allowing the guiding portion to pass through.

In the foregoing turning interlocking coupling structure, the head includes two limiting portions which are configured to correspond in position to the first stopping portion and the second stopping portion.

In the foregoing turning interlocking coupling structure, the limiting portion is configured to limit the head to move longitudinally according to the structure of the first stopping portion or the second stopping portion.

In the foregoing turning interlocking coupling structure, the guiding portion is a hole, a groove, a recess, a protrusion, a limiting portion, a step portion, a planar portion, an arc surface portion or a curved surface portion.

In the foregoing turning interlocking coupling structure, the yielding space is a hole, a groove, a recess, a protrusion, a limiting portion, a step portion, a planar portion, an arc surface portion or a curved surface portion.

In the foregoing turning interlocking coupling structure, the head is configured to move downward and is limited to move according to the structure of the first stopping portion or the second stopping portion by the limiting portion, and to enable the guiding portion to move rotationally in a yielding space while passing through the yielding space, so as to drive the fastening portion to rotate.

In the foregoing turning interlocking coupling structure, an allowance space is provided below the guiding portion to allow the guiding portion to pass through the yielding space of the head, so as to give way to a non-yielding structure of the head and to enable the head to rotate by the allowance space.

In the foregoing turning interlocking coupling structure, the assembly portion includes a feed trough, and a shoulder of the body is pressed by an external force so as to enable the assembly portion to be assembled with the first object.

In the foregoing turning interlocking coupling structure, the assembly portion includes a feed trough, and a sleeve connection portion of the head is pressed by an external force so as to enable the assembly portion to be assembled with the first object.

In the foregoing turning interlocking coupling structure, the assembly portion includes a deformation portion configured to be pressed by an external force so as to be engaged with the first object and to be assembled with the first object.

In the foregoing turning interlocking coupling structure, an elastic element is further included. One end of the elastic element is abutted against the head, and the other end of the elastic element is abutted against the body.

In the foregoing turning interlocking coupling structure, the elastic element is a spring, a helical spring, an elastic piece, an elastic column or a torsion spring.

In the foregoing turning interlocking coupling structure, the elastic element is a torsion spring configured to limit by the limiting portion and the first stopping portion, or to limit rotation by the second stopping portion, and to rotate automatically when a yielding space of the head enters a guiding portion of the body, so as to drive the fastening portion to rotate automatically.

In the foregoing turning interlocking coupling structure, one end of the torsion spring is vertical and the other end is horizontal, both ends are vertical, or both ends are horizontal, so as to interfere with or be assembled with the head or the body and to drive the head and the fastening portion to rotate automatically or rotate reciprocally.

In the foregoing turning interlocking coupling structure, the assembly portion is configured to be fasteningly connected, rivetingly connected, expandingly connected, lockingly connected or weldingly connected to the first object.

In the foregoing turning interlocking coupling structure, the limiting portion is a planar portion, a protrusion, a recess, a step surface portion, a hole, a groove, an arc surface portion or a curved surface portion.

In the foregoing turning interlocking coupling structure, the first stopping portion or the second stopping portion is a planar portion, a protrusion, a recess, a step surface portion, a hole, a groove, an arc surface portion or a curved surface portion.

In the foregoing turning interlocking coupling structure, the fastening portion is a protruding fastener, a recessed fastener, a thread body or a column.

In the foregoing turning interlocking coupling structure, the head has a yielding space, the body includes a guiding portion, and the yielding space is configured to release interference from or limit the amount of movement of the guiding portion.

In the foregoing turning interlocking coupling structure, the head has a yielding space, the body includes a guiding portion, and the structure of the guiding portion and the yielding space is configured to limit the amount of movement or rotation of the head, or to limit a stop position of rotation or movement of the head.

In the foregoing turning interlocking coupling structure, the body includes a motion portion configured to enable an end portion of the torsion spring to spin in the motion portion.

In the foregoing turning interlocking coupling structure, the guiding portion has a rotation angle of 5 degrees to 165 degrees in the yielding space.

In the foregoing turning interlocking coupling structure, the assembly portion includes a weldable surface configured to be welded to the surface of the first object or a through hole of the first object.

In the foregoing turning interlocking coupling structure, the head and the fastening portion are configured for fastening connection assembly, sleeve connection assembly, rivet connection assembly, expansion connection assembly, welding connection assembly or lock connection assembly, or the head and the fastening portion are formed integrally.

In the foregoing turning interlocking coupling structure, a fitting fastening portion is provided on one end of the fastening portion. The fitting fastening portion is configured to be fittingly fastened and assembled with the head, or the fitting fastening portion is configured to be fittingly fastened or assembled with the head having an elastic plastic material.

In the foregoing turning interlocking coupling structure, the fitting fastening portion or the head includes a guiding surface configured to better guide and fit the fitting fastening portion in the head. The guiding surface is an inclined surface, an arc surface, a curved surface, a step surface, a recess, a protrusion, a straight surface, or a planar surface.

In the foregoing turning interlocking coupling structure, the head is manufactured by plastic in-mold injection.

In the foregoing turning interlocking coupling structure, the head includes an anti-rotation structure, and the fastening portion includes a corresponding anti-rotation structure for preventing rotation of the head.

Thus, the turning interlocking coupling structure of the present invention is capable of enabling the body to be stably coupled to the first object, and enabling the fastening portion to be fasteningly connected to or be unfastened from the second object by turning the head, so as to complete coupling and separation of at least two objects and achieve the object of repeated quick coupling and separation.

DETAILED DESCRIPTION OF THE INVENTION

Figure 1:
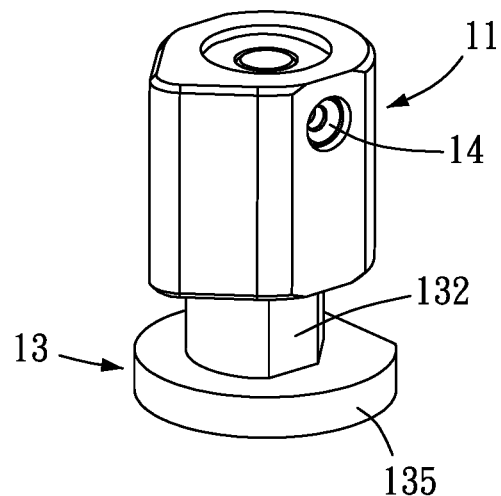
FIG. 1 is a schematic diagram of an appearance according to a first embodiment of the present invention.
Figure 2:
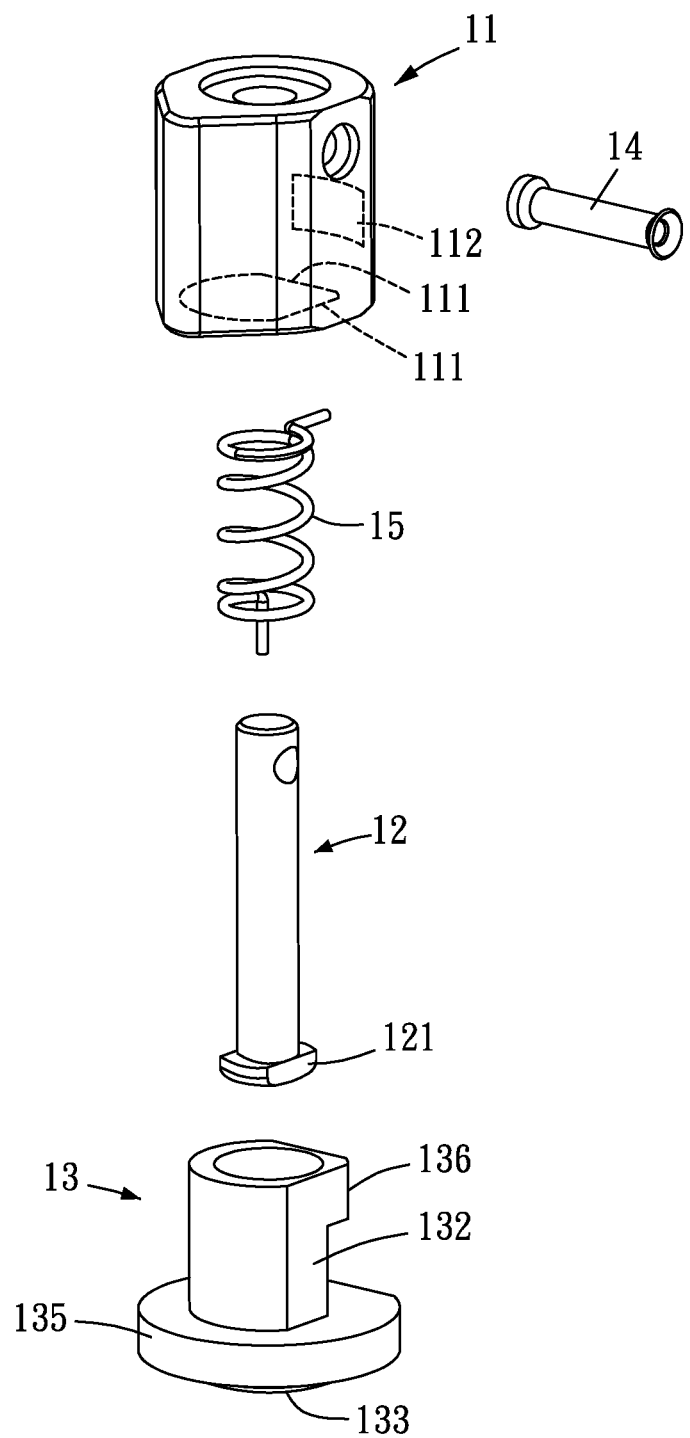
FIG. 2 is an exploded schematic diagram according to the first embodiment of the present invention.
Figure 3:
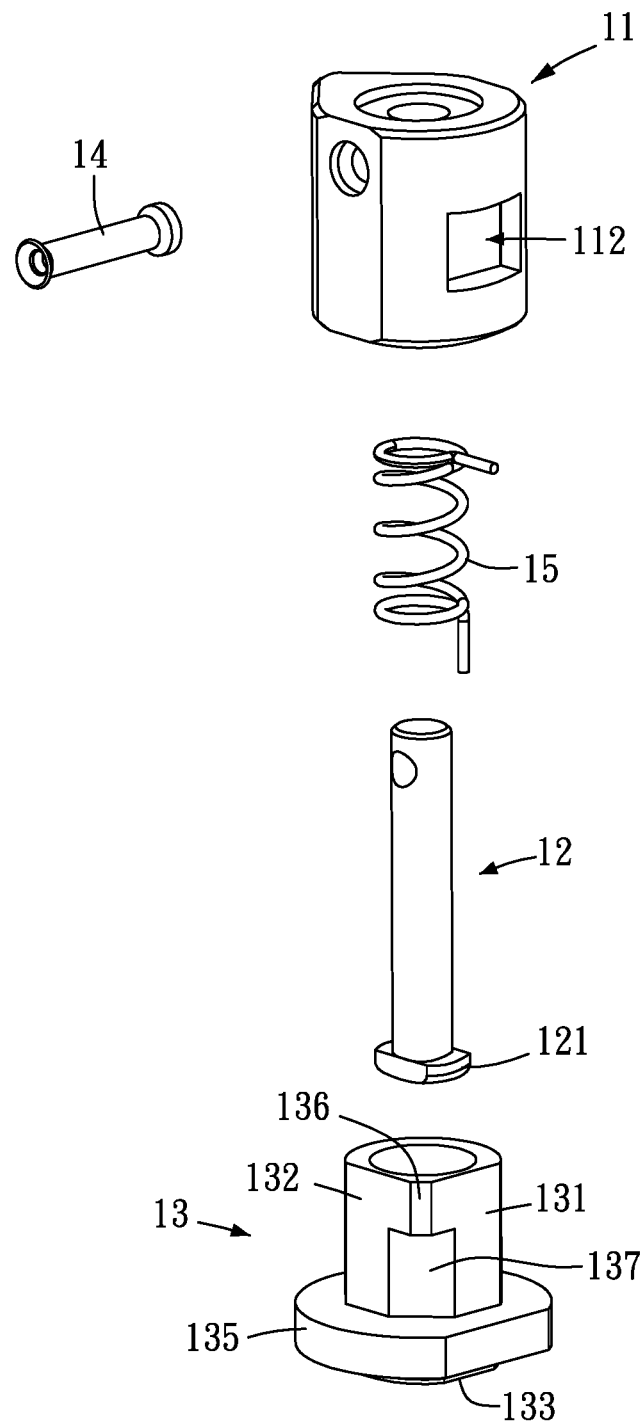
FIG. 3 is another exploded schematic diagram according to the first embodiment of the present invention.
Figure 4:
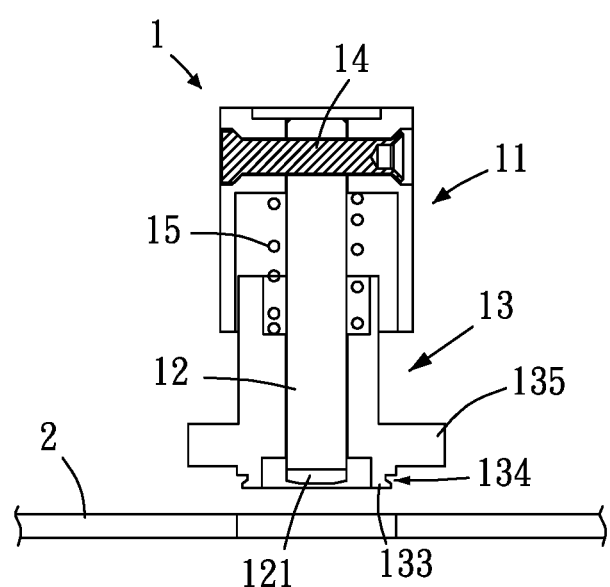
FIG. 4 is a first schematic diagram of a state of use according to the first embodiment of the present invention.
Figure 5:
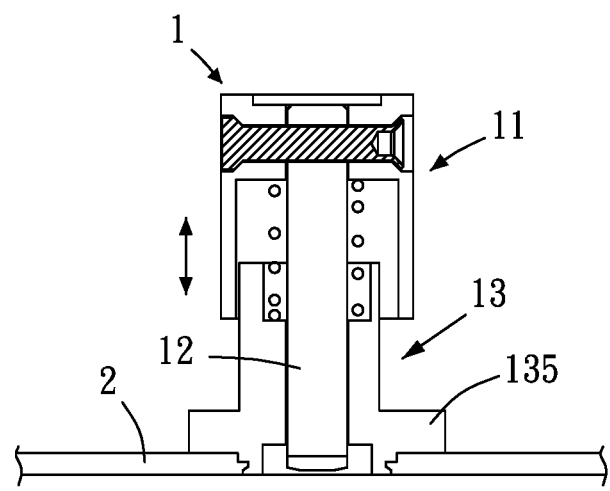
FIG. 5 is a second schematic diagram of a state of use according to the first embodiment of the present invention.
Figure 6:
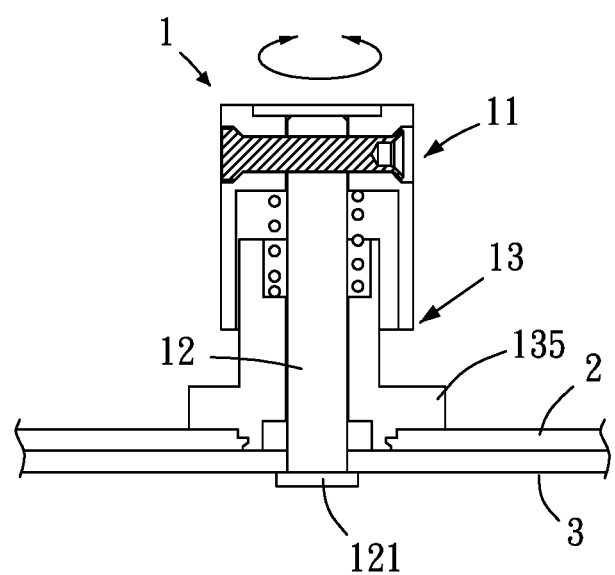
FIG. 6 is a third schematic diagram of a state of use according to the first embodiment of the present invention.
Figure 7:
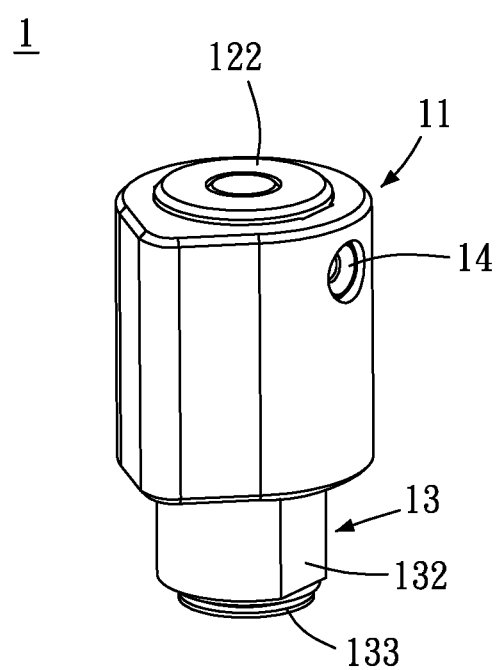
FIG. 7 is a schematic diagram of an appearance according to a second embodiment of the present invention.
Figure 8:
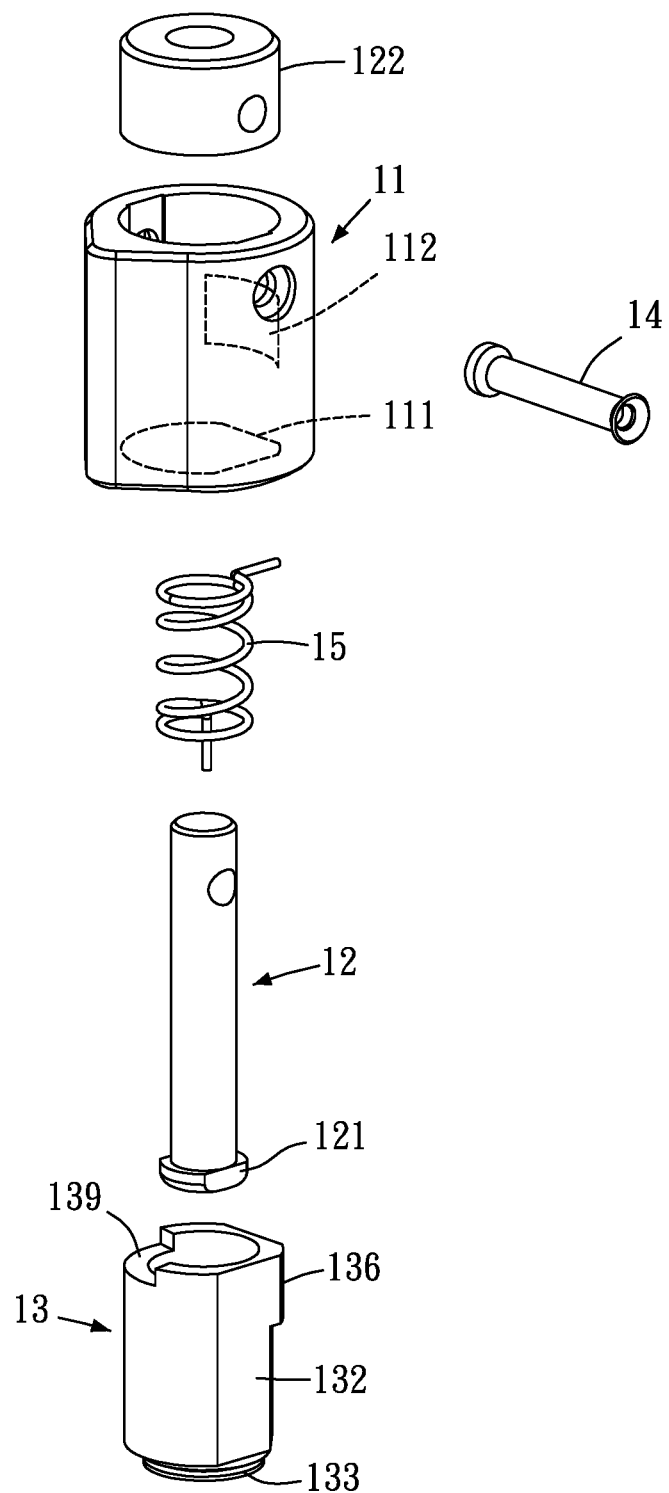
FIG. 8 is an exploded schematic diagram according to the second embodiment of the present invention.
Figure 9:
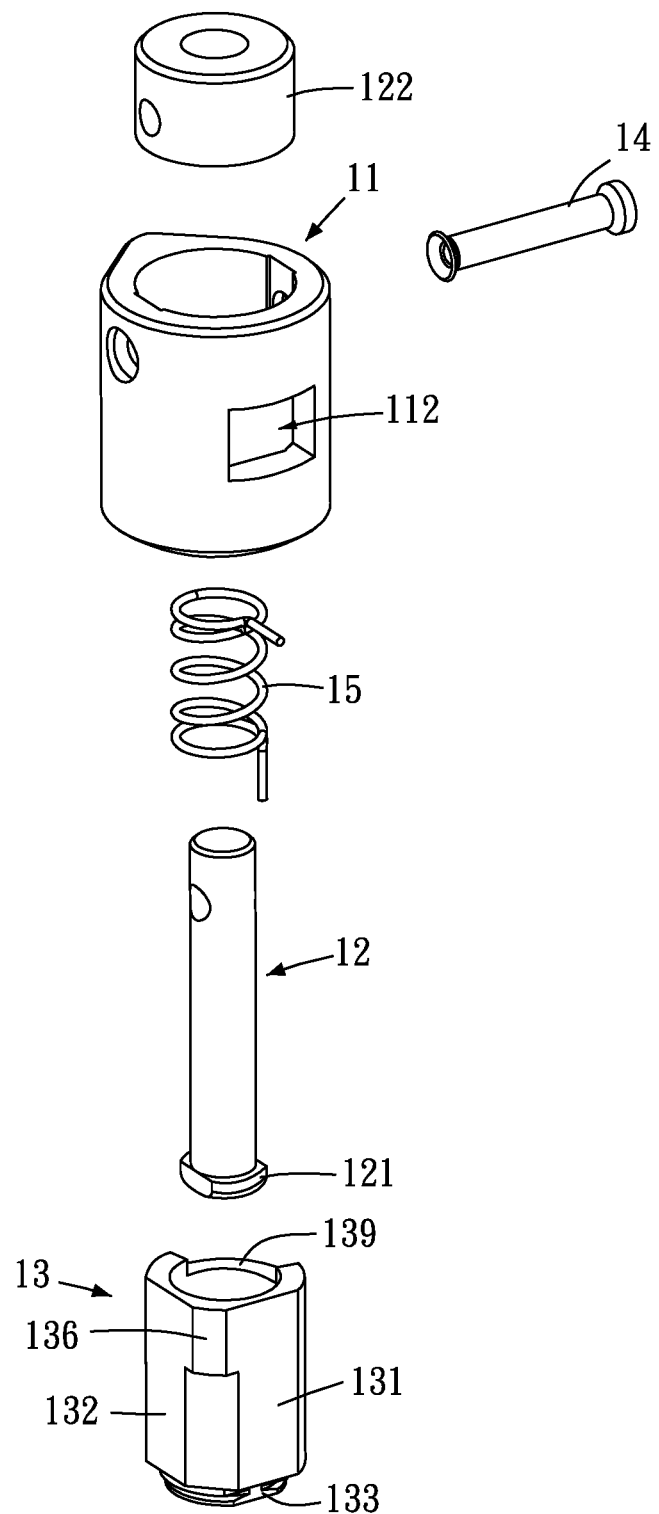
FIG. 9 is another exploded schematic diagram according to the second embodiment of the present invention.
Figure 10:
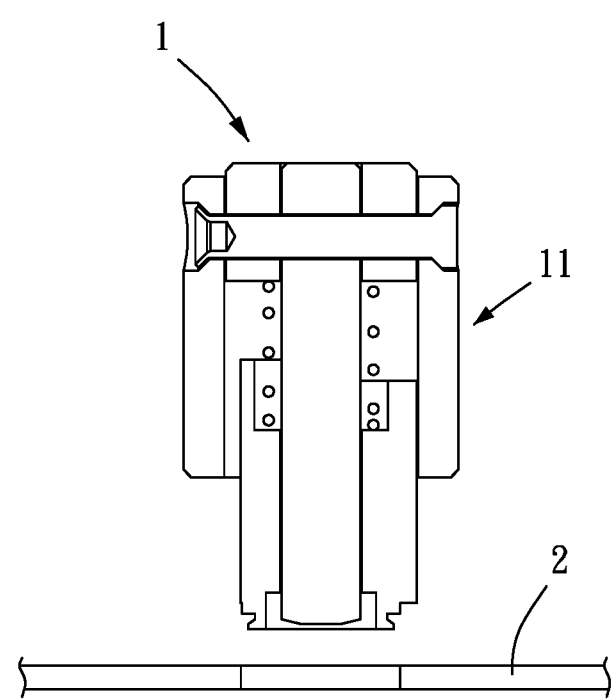
FIG. 10 is a first schematic diagram of a state of use according to the second embodiment of the present invention.
Figure 11:
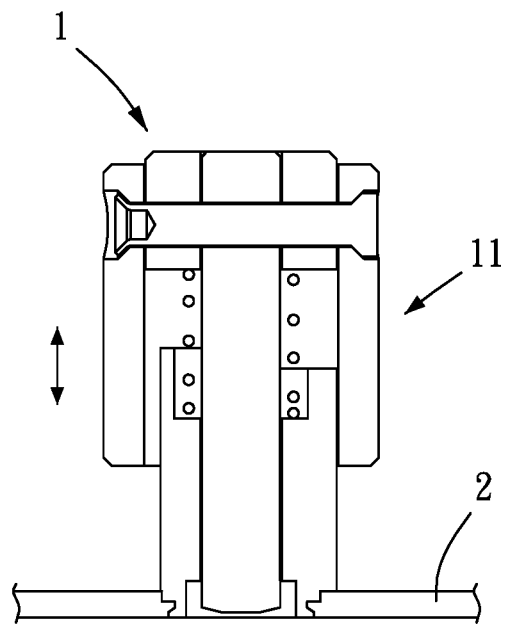
FIG. 11 is a second schematic diagram of a state of use according to the second embodiment of the present invention.
Figure 12:
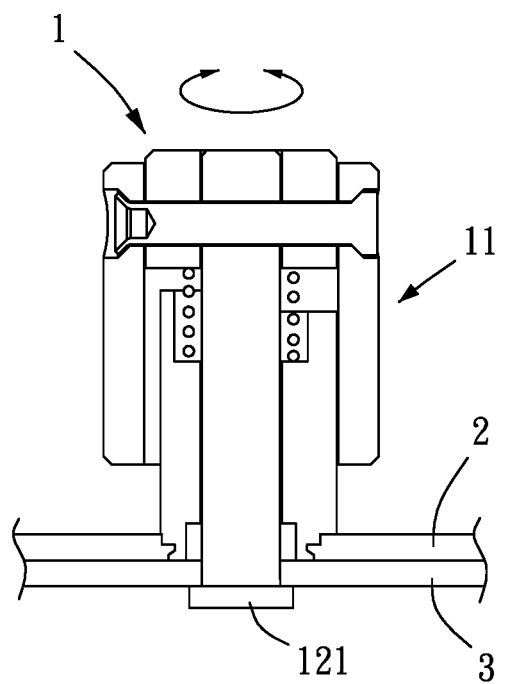
FIG. 12 is a third schematic diagram of a state of use according to the second embodiment of the present invention.

To fully understand the objects, features and functions of the present invention, details of the present invention are given in specific embodiments with the accompanying drawings below.

Referring to FIG. 1 to FIG. 6, as shown in the figures, the present invention provides a turning interlocking coupling structure 1 including a head 11, a fastening portion 12 and a body 13.

The head 11 is provided with a limiting portion 111 on an inner edge thereof.

The fastening portion 12 is coupled with the head 11.

The body 13 is movably coupled with the head 11, and renders the fastening portion 12 to extend into the body 13. The body 13 includes a first stopping portion 131 and a second stopping portion 132 on an outer edge thereof. When the head 11 is driven, the head 11 is limited at the first stopping portion 131 or the second stopping portion 132 by the limiting portion 111, so as to enable the fastening portion 12 to be unfastened from or be fasteningly connected to a second object 3.

For assembly, the body 13 may be assembled to a first object 2. For fastening connection, the head 11 may be first pressed downward and the head 11 is turned, such that the limiting portion 111 on the inner edge of the head 11 moves from the first stopping portion 131 originally limited to the second stopping portion 132, and while turning, the head 11 drives the fastening portion 12 to be fasteningly connected to the second object 3. For unlocking, the head 11 is turned in a reverse direction, such that the limiting portion 111 on the inner edge of the head 11 moves from the second stopping portion 132 originally limited to the first stopping portion 131, and while turning, the head 11 drives the fastening portion 12 to be unfastened from the second object 3, so as to enable the limiting portion 111 to limit the head 11 to move longitudinally according to the structure of the first stopping portion 131 or the second stopping portion 132. Thus, the body 13 is enabled to be stably coupled to the first object 2, and the fastening portion 12 is fasteningly connected to or unfastened from the second object 3 by turning the head 11, so as to complete coupling and separation of at least two objects and achieve the object of repeated quickly coupling and separation.

In a preferred specific embodiment of the present invention, one end of the fastening portion 12 is coupled to the head 11 by a bolt connector 14. Thus, the fastening portion 12 is enabled to be stably coupled with the head 11 by the bolt connector 14, preventing loosening during use.

In a preferred specific embodiment of the present invention, an elastic element 15 is further included. One end of the elastic element 15 is abutted against the head 11, and the other end is abutted against the body 13. Thus, when the head 11 drives the fastening portion 12 to be fasteningly connected to the second object 3, the elastic element 15 may be compressed, so as to further enable the fastening portion 12 to be fasteningly connected to the second object 3 in a stable manner by using the abutting elastic force of the elastic element 15. Furthermore, when the head 11 drives the fastening portion 12 to be unfastened from the second object 3, the elastic element 15 is elastically released, so as to constantly thrust out the head 11 for the next use. Thus, the present invention is enabled to better meet requirements of actual applications.

The elastic element 15 may be a spring, a helical spring, an elastic piece, an elastic column or a torsion spring. Thus, the present invention is enabled to better meet requirements of actual applications.

In a preferred specific embodiment of the present invention, a fastener 121 is provided on the other end of the fastening portion 12. The fastener 121 is configured to be fasteningly connected to the second object 3. Thus, for fastening connection, the head 11 may drive the fastener 121 of the fastening portion 12 to be fasteningly connected to the second object 3, and the elastic element 15 is compressed, so as to enable the fastener 121 of the fastening portion 12 to be fasteningly connected to the second object 3 in a stable manner by using the abutting elastic force of the elastic element 15.

In a preferred specific embodiment of the present invention, the body 13 includes an assembly portion 133 which includes a feed through 134. To assemble the body 13 with the first object 2, an external force may be applied to the body 13 such that the material of the first object 2 is pressed into or flows into the feed through 134, so as to assemble the assembly portion 133 with the first object 2. Thus, the present invention is enabled to better meet requirements of actual applications.

Furthermore, the assembly portion 133 may be fasteningly connected, rivetingly connected, expandingly connected, lockingly connected or weldingly connected to the first object 2. Thus, the body 13 is enabled to be stably assembled to the first object 2.

In a preferred specific embodiment of the present invention, the body 13 includes a shoulder 135. To assemble the body 13 with the first object 2, an external force may be applied to the shoulder 135, such that the assembly portion 133 becomes assembled with the first object 2 and leans against the first object 2 by the shoulder 135. Accordingly, the shoulder 135 may be leaned against the first object 2 once the body 13 is assembled with the first object 2 by the assembly portion 133. Thus, the body 13 is enabled to be stably assembled to the first object 2.

In a preferred specific embodiment of the present invention, a guiding portion 136 is provided between the first stopping portion 131 and the second stopping portion 132 (or a guiding portion 136 that is not shown in the figure is provided at a position near the first stopping portion 131), and the head 11 has a yielding space 112 for allowing the guiding portion 136 to pass through. Accordingly, for fastening connection, the head 11 may be first pressed downward and the elastic element 15 is compressed, such that the yielding space 112 corresponds in position to the guiding portion 136. The head 11 is then turned, such that the head 11 passes through the guiding portion 136 by the yielding space 112, and the limiting portion 111 of the head 11 moves from the first stopping portion 131 originally limited to the second stopping portion 132. Furthermore, while turning, the head 11 at the same time drives the fastening portion 12 to be fasteningly connected to the second object 3 by the fastener 121, so as to further enable the fastener 121 to be fasteningly connected to the second object 3 in a stable manner by using the abutting elastic force of the elastic element 15. To unlock, the head 11 is turned in a reverse direction, such that the head 11 passes through the guiding portion 136 by the yielding space 112, and the limiting portion 111 of the head 11 moves from the second stopping portion 132 originally limited to the first stopping portion 131. Furthermore, while turning, the head 11 at the same time drives the fastener 121 of the fastening portion 12 to be unfastened from the second object 3, and the elastic element 15 is elastically released to constantly thrust out the head 11 for the next use. Thus, the body 13 is enabled to be stably coupled to the first object 2, and the fastening portion 12 is enabled to be fasteningly connected to or be unfastened from the second object 3 by turning the head 11, so as to complete coupling and separation of at least two objects and achieve the object of repeated quickly coupling and separation.

In a preferred specific embodiment of the present invention, the elastic element 15 is a torsion spring, and is configured to limit by the limiting portion 111 and the first stopping portion 131, or to limit rotation by the second stopping portion 132, and to automatically rotate when the yielding space 112 of the head 11 enters the guiding portion 136 of the body 13 to further drive the fastening portion 12 to rotate automatically. Thus, the present invention is enabled to better meet requirements of actual applications.

In a preferred specific embodiment of the present invention, one end of the torsion spring is vertical and the other end is horizontal, both ends are vertical, or both ends are horizontal, so as to interfere with or be assembled with the head 11 or the body 13 to drive the head 11 and the fastening portion 12 to rotate automatically or rotate reciprocally. Thus, the present invention is enabled to better meet requirements of actual applications.

In a preferred specific embodiment of the present invention, the body 13 includes a motion portion 139 configured to allow an end portion of the torsion spring to spin in the motion portion 139.

In a preferred specific embodiment of the present invention, the limiting portion 111 may be a planar portion, a protrusion, a recess, a step surface portion, a hole, a groove, an arc surface portion or a curved surface portion. The first stopping portion 131 or the second stopping portion 132 may be a planar portion, a protrusion, a recess, a step surface portion, a hole, a groove, an arc surface portion or a curved surface portion. Thus, the present invention is enabled to better meet requirements of actual applications.

In a preferred specific embodiment of the present invention, the head 11 includes two limiting portions 111 configured to correspond in position to the first stopping portion 131 and the second stopping portion 132. Thus, the present invention is enabled to better meet requirements of actual applications.

In a preferred specific embodiment of the present invention, the head 11 is configured to move downward, and is limited to move longitudinally according to the structure of the first stopping structure 131 or the second stopping structure 132 by the limiting portion 111. Furthermore, the head 11 is configured to allow the guiding portion 136 to move rotationally in the yielding space 112 while passing through the yielding space 112 so as to drive the fastening portion 12 to rotate. Thus, the present invention is enabled to better meet requirements of actual applications.

In a preferred specific embodiment of the present invention, an allowance space 137 is provided below the guiding portion 136, so as to give way to a non-yielding structure of the head 11 when the guiding portion 136 passes through the yielding space 112 of the head 11, and to enable the head 11 to rotate by the allowance space 137. Thus, the present invention is enabled to better meet requirements of actual applications.

In a preferred specific embodiment of the present invention, the allowance space 137 is configured to release interference from or limit the amount of movement of the guiding portion 136.

In a preferred specific embodiment of the present invention, the yielding space 112 is configured to interfere or movably limit the guiding portion 136, so as to limit the amount of movement or rotation of the head 11, or to limit the stop position of rotation or movement of the head 11. Thus, the present invention is enabled to better meet requirements of actual applications.

In a preferred specific embodiment of the present invention, the guiding portion 136 may be a hole, a groove, a recess, a protrusion, a limiting portion, a step portion, a planar portion, an arc surface portion or a curved surface portion. The yielding space 112 may be a hole, a groove, a recess, a protrusion, a limiting portion, a step portion, a planar portion, an arc surface portion or a curved surface portion. Thus, the present invention is enabled to better meet requirements of actual applications.

In a preferred specific embodiment of the present invention, the guiding portion 136 has a rotation angle of 5 degrees to 165 degrees in the allowance space 137.

In a preferred specific embodiment of the present invention, the head 11 and the fastening portion 12 are configured for fastening connection assembly, sleeve connection assembly, rivet connection assembly, expansion connection assembly, welding connection assembly or lock connection assembly, or the head 11 and the fastening portion 12 are formed integrally. Thus, the present invention is enabled to better meet requirements of actual applications.

Referring to FIG. 7 to FIG. 12, as shown in the figures, in a preferred specific embodiment of the present invention, a sleeve connection portion 122 is provided on one end of the fastening portion 12. The sleeve connection portion 122 couples the fastening portion 12 and the head 11 by a bolt connector 14. Thus, the fastening portion 12 is enabled to be stably coupled to the head 11 by fitting of the sleeve connection portion 122 and the bolt connector 14.

An elastic element 15 is further included in this embodiment. One end of the elastic element 15 is abutted against the sleeve connection portion 122, and the other end of the elastic element 15 is abutted against the body 13.

For assembly of this embodiment, the head 13 may be assembled to the first object 2 by the assembly portion 133. For fastening connection, the head 11 may be first pressed downward to compress the elastic element 15, such that the yielding space 112 corresponds in position to the guiding portion 136. Then, the head 11 is turned, such that the head 11 passes through the guiding portion 136 by the yielding space 112, and the limiting portion 111 of the head 11 moves from the first stopping portion 131 originally limited to the second stopping portion 132. While turning, the head 11 at the same time drives the fastening portion 12 to be fasteningly connected to the second object 3 by the fastener 121, so as to enable the fastener 121 to be fasteningly connected to the second object 3 in a stable manner by the abutting elastic force of the elastic element 15. To unlock, the head 11 is turned in a reverse direction, such that the head 11 passes through the guiding portion 136 by the yielding space 112, and the limiting portion 111 of the head 11 moves from the second stopping portion 132 originally limited to the first stopping portion 131. While turning, the head 11 at the same time drives the fastener 121 of the fastening portion 12 to be unfastened from the second object 3, and the elastic element 15 becomes elastically released to constantly thrust out the head 11 for the next use. Thus, the body 13 is enabled to be stably coupled to the first object 2, and the fastening portion 12 is enabled to be fasteningly connected to or be unfastened from the second object 3 by turning the head 11, so as to complete coupling and separation of at least two objects and achieve the object of repeated quick coupling and separation.

In a preferred specific embodiment of the present invention, to assemble the body 13 with the first object 2, an external force may be applied to the sleeve connection portion 122 of the head 11, such that the material of the first object 2 is pressed into or flows into the feed through 134 so as to enable the assembly portion 133 to be assembled with the first object 2. Thus, the present invention is enabled to better meet requirements of actual applications.

Figure 13:
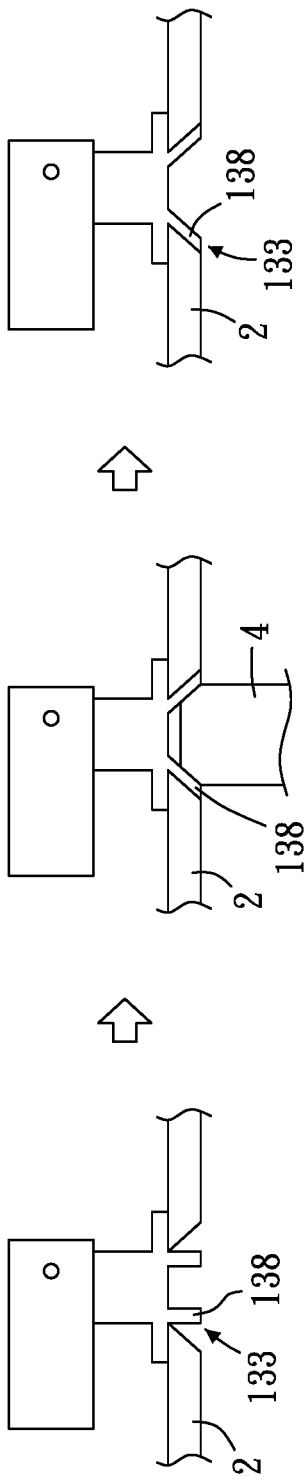
FIG. 13 is a schematic diagram of an assembly state according to a third embodiment of the present invention.

Referring to FIG. 13, as shown in the figure, the assembly portion 133 includes a deformation portion 138. By pressing on the deformation portion 138 by a tool 4, the deformation portion 138 is pressed by an external force and becomes engaged with the first object 2, so as to be assembled with the first object 2. Thus, the present invention is enabled to better meet requirements of actual applications.

Furthermore, in a preferred specific embodiment of the present invention, the assembly portion 133 has a weldable surface configured to be welded to the surface of the first object 2 or a through hole (not shown) of the first object 2.

Figure 14:
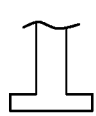
FIG. 14 is a schematic diagram of different forms of a fastening portion of the present invention.
Figure 14:
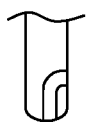
Figure 14:
Figure 14:
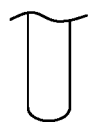

Referring to FIG. 14, as shown in the figure, the fastening portion 12 is a protruding fastener (as part an in FIG. 14), a recessed fastener (as part b in FIG. 14), a thread body (as part c in FIG. 14) or a column (as part d in FIG. 14). Thus, the present invention is enabled to better meet requirements of actual applications.

Figure 15:
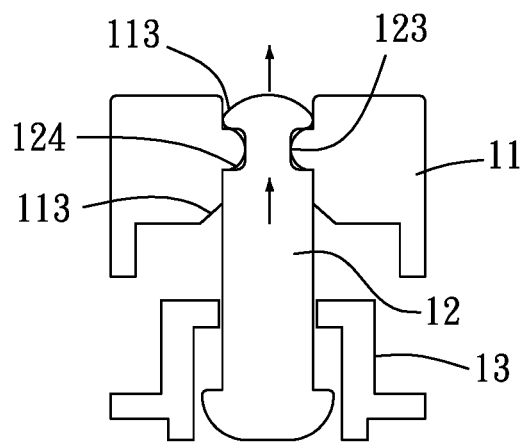
FIG. 15 is a schematic diagram of a section state according to a fourth embodiment of the present invention.

Referring to FIG. 15, as shown in the figure, a fitting fastening portion 123 is provided on one end of the fastening portion 12. The fitting fastening portion 123 is configured to be fittingly fastened and assembled with the head 11, or is configured to be fittingly fastened and assembled with the head 11 having an elastic plastic material. Furthermore, the fitting fastening portion 123 or the head 11 has a guiding surface 124 or 113, so as to enable the fitting fastening portion 123 to be guided and fitted in the head 11. The guiding surface 124 or 113 is an inclined surface, an arc surface, a curved surface, a step surface, a recess, a protrusion, a straight surface or a planar surface.

Figure 16:
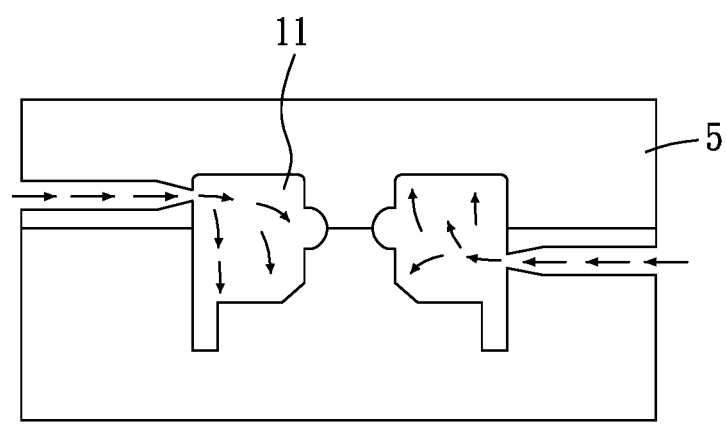
FIG. 16 is a schematic diagram according to a fifth embodiment of the present invention.

Referring to FIG. 16, as shown in the figure, the head 11 is manufactured by a mold 5 by means of plastic in-mold injection.

Figure 17:
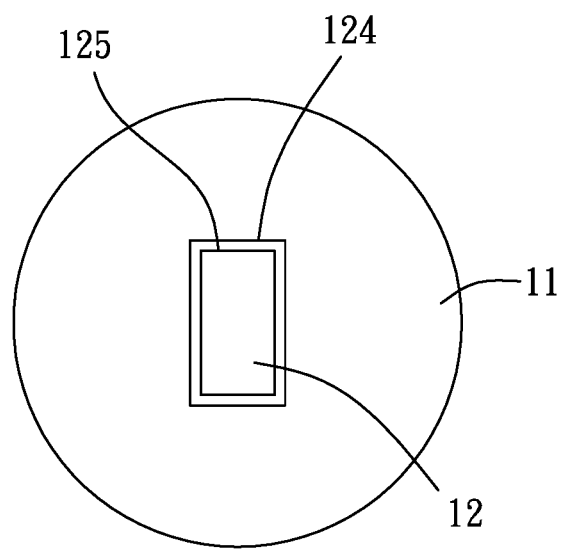
FIG. 17 is a schematic diagram according to a sixth embodiment of the present invention.

Referring to FIG. 17, as shown in the figure, the head 11 includes an anti-rotation structure 114, and the fastening portion 12 includes a corresponding anti-rotation structure 125 configured to prevent rotation of the head 11.

While the present invention has been described by way of preferred embodiments above, a person skilled in the art should understood that the embodiments are for illustrating the present invention and are not to be construed as limitations to the scope of the present invention. It should be noted that, equivalent modifications and substitutions made to the embodiments are to be encompassed within the scope of the present invention. Therefore, the legal protection for the present invention should be defined by the appended claims.

What is claimed is:

1. A turning interlocking coupling structure, comprising:
   a head, comprising a limiting portion;
   a fastening portion, coupled with the head; and
   a body, movably coupled with the head and rendering the fastening portion to be extended to the body, the body comprising a first stopping portion and a second stopping portion, the body being configured to be assembled to a first object, the head being, when driven, limited at the first stopping portion or the second stopping portion by the limiting portion, so as to enable the fastening portion to be unfastened from or be fasteningly connected to a second object;
   wherein a guiding portion is provided between the first stopping portion and the second stopping portion, and the head has a yielding through hole for allowing the guiding portion to pass through.

2. The turning interlocking coupling structure according to claim 1, wherein one end of the fastening portion is coupled to the head by a bolt connector.

3. The turning interlocking coupling structure according to claim 2, further comprising:
   an elastic element, one end of the elastic element being abutted against the head and one other end of the elastic element being abutted against the body.

4. The turning interlocking coupling structure according to claim 1, wherein a fastener is provided on one end of the fastening portion and is configured to be fasteningly connected to the second object.

5. The turning interlocking coupling structure according to claim 1, wherein the body comprises an assembly portion, the assembly portion is configured to be assembled to the first object and comprises a feed trough, the turning interlocking coupling structure is configured to receive pressure of an external force such that a material of the first object is pressed into or flows into the feed trough so as to enable the assembly portion to be assembled with the first object.

6. The turning interlocking coupling structure according to claim 1, wherein the body comprises a shoulder configured to be leaned against the first object.

7. The turning interlocking coupling structure according to claim 1, wherein the head comprises two limiting portions configured to correspond in position to the first stopping portion and the second stopping portion.

8. The turning interlocking coupling structure according to claim 1, wherein the limiting portion is configured to limit the head to move longitudinally according to a structure of the first stopping portion or the second stopping portion.

9. The turning interlocking coupling structure according to claim 1, wherein the head is configured to move downward and to move according to a structure of the first stopping portion or the second stopping portion by the limiting portion, and to enable the guiding portion to move rotationally in the yielding through hole when passing through the yielding through hole, so as to drive the fastening portion to rotate.

10. The turning interlocking coupling structure according to claim 1, wherein an allowance space is provided below the guiding portion and is configured to allow the guiding portion to pass through the yielding through hole of the head, so as to give way to a non-yielding structure of the head and to enable the head to rotate by the allowance space.

11. The turning interlocking coupling structure according to claim 5, wherein shoulder of the body is pressed by an external force so as to enable the assembly portion to be assembled with the first object.

12. The turning interlocking coupling structure according to claim 1, further comprising:
an elastic element, one end of the elastic element being abutted against the head and one other end of the elastic element being abutted against the body, the elastic element being a torsion spring, and being configured to limit position by the limiting portion and the first stopping portion or to limit rotation by the second stopping portion and to automatically rotate when the yielding through hole of the head enters the guiding portion of the body, so as to drive the fastening portion to rotate automatically.

13. The turning interlocking coupling structure according to claim 3, wherein the elastic element is a torsion spring configured to limit position by the limiting portion and the first stopping portion or to limit rotation by the second stopping portion, and to automatically rotate when the yielding through hole of the head enters the guiding portion of the body, so as to drive the fastening portion to rotate automatically.

14. The turning interlocking coupling structure according to claim 1, wherein the yielding through hole is configured to release interference from or limit an amount of movement of the guiding portion.

15. The turning interlocking coupling structure according to claim 1, wherein a structure of the guiding portion and the yielding through hole is configured to limit an amount of rotation or movement of the head, or to limit a stop position of rotation or movement of the head.

* * * * *